Jan. 27, 1959   E. LADELL   2,871,279
SECURITY MEANS FOR WATER COOLED STIRRING WINDINGS
Filed Oct. 22, 1957
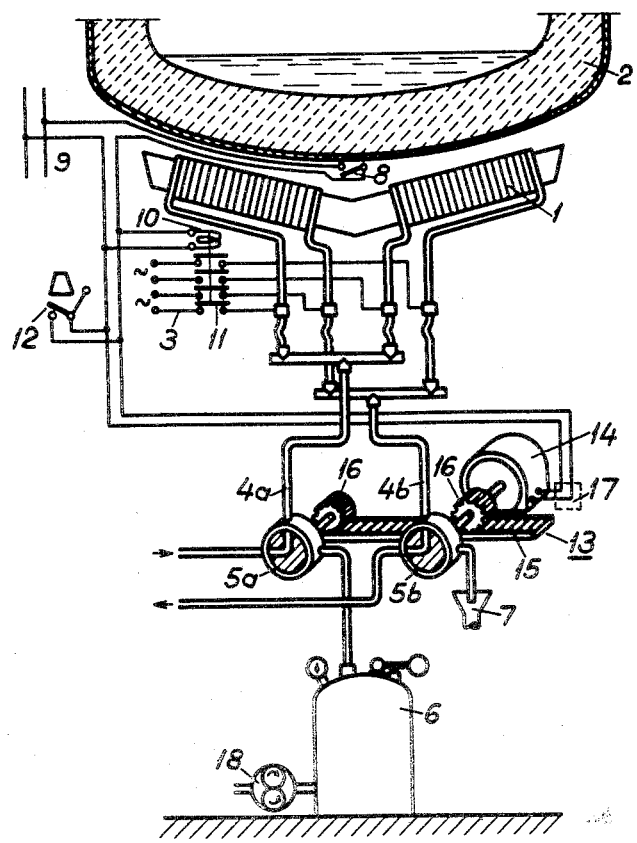
Inventor
Emil Ladell
By James Aiken
Attorney.

United States Patent Office 2,871,279
Patented Jan. 27, 1959

2,871,279

SECURITY MEANS FOR WATER COOLED STIRRING WINDINGS

Emil Ladell, Vasteras, Sweden, assignor to Allmanna Svenska Elektriska Aktiebolaget, Vasteras, Sweden, a corporation of Sweden Application October 22, 1957, Serial No. 691,757

Claims priority, application Sweden October 30, 1956

1 Claim. (Cl. 13—26)

Induction stirring windings for the molten metal in furnaces, have hitherto in most cases been provided with water cooling means in such a manner that the cooling water has been passed through separate cooling pipes arranged in contact with the conductors or through the hollow conductors themselves. However, in steelworks it is dangerous to have water in the vicinity of the molten metal because of the considerable explosion risk which occurs when quantities of water are included in the molten metal and are vaporized, which gives rise to explosions spraying the molten metal and injuring the personnel and damaging material.

On the other hand, it is very disadvantageous to do without water as a cooling medium for stirring means and to employ air, since air cooling is not so effective and requires costly and large stirrers and complicated supply means for the coolant to the furnace.

The purpose of the present invention is to eliminate the risk of explosion when water is used for cooling.

The principal feature of the invention is, that a compressed air system is coupled with the cooling system of the stirring winding with the aim of blowing out the water from said cooling system in the event that risk will occur of the molten metal penetrating through the furnace.

Another feature of the invention is a manual or automatic means which gives the impulse for blowing out the water with the aid of the temperature measuring means which, as a rule, are present in the furnace equipment.

The accompanying drawing shows by way of example an embodiment of the security means according to the invention.

The invention may be applied to stirring windings constructed as conventional coil windings, i. e. like the stator windings of polyphase asychronous motors, as well as for polyphase cylindrical windings slid on straight iron yokes. On the drawing, stirring windings 1, of the latter type, are illustrated diagrammatically, lying below the furnace 2 and connected by leads 3 to electric power sources, not shown. The ends of the windings are also connected to a cooling water circulation system, not shown, by inlet and outlet pipes 4a and 4b respectively, by means of two-way valves 5a and 5b. During normal operation water is supplied to the windings through the valve 5a and is returned through the valve 5b, as indicated by the position of the valves in the drawing. If risk of the molten metal penetrating the furnace occurs the power supply to the stirring windings is interrupted and the valve 5a is turned so that a compressed air system 6 is connected to the cooling water inlet pipe 4a and the valve 5b is simultaneously turned so that the return pipe 4b is connected to an outlet 7. The cooling water is blown out from the hollow turns of the windings with a pressure of, for instance, 2 to 3 kg. per cm.² The valve 5b may then be closed in order to reduce the consumption of compressed air. The compressed air may also be used for a pre-determined time for further cooling of the windings. The operation of the devices which interrupt the power supply and throw over the valves 5a and 5b from the position of cooling water circulation to the position of blowing out the water by compressed air may be controlled and timed in such a manner that, firstly the power is cut down from the stirring means and then the water circulation is replaced by blowing out the cooling water by compressed air. Obviously the switching over from cooling water to compressed air may also be performed manually from a place out of the danger zone.

These operations may be performed by any known means and therefore, the devices employed for this purpose are only indicated diagrammatically on the drawing. The temperature between the furnace 2 and the windings 1 may be watched by thermostats 8 in an auxiliary circuit 9 comprising a relay 10 for operating the switch 11 for the power supply to the stirring windings, an alarm device 12 and a means generally indicated by 13 for operating the valves 5a and 5b. This operating means is symbolized by a motor 14, a rack 15 and two pinions 16, coupled to the valves 5a and 5b. A time lag device for delaying the starting of the motor 14 is indicated by 17. 18 is a compressor for the air. If the yoke of the stirring winding is also provided with cooling channels, these channels are preferably included in the compressed air system. For the protection of an electric stirring winding located below the furnace, from molten metal that may penetrate the furnace bottom, it has been heretofore proposed to arrange a heat-insulating layer of a refractory material between such winding and the furnace bottom. For proper efficiency such a layer must have a certain thickness so that the gap between the winding and the furnace bottom is increased, with the result that the electric power for the stirring winding must also be increased, and the present invention overcomes this drawback. In certain cases, however, a combination of both these measures may be employed, i. e., a layer of refractory material and a blowout arrangement according to the present invention.

I claim as my invention:

Stirring means for the molten metal in furnaces, located substantially below the furnace bottom and comprising polyphase coils fed from an alternating current source, channels within said coils for the passage of cooling water under normal operation of the stirring means, inlet and outlet means for the supply of the cooling water to said channels, a source of compressed air for substituting the supply of compressed air for the supply of water in the event of risk of the molten metal penetrating the bottom of the furnace, two-way valve means inserted in said inlet and outlet means respectively, for alternatively feeding cooling water or compressed air to said channels, means for operating said two-way valve means, and means responsive to the temperature of the furnace bottom for operating the two-way valve operating means and comprising time lag means for interrupting the supply of electric power to the stirring means prior to the supply of compressed air to the channels of said stirring means.

References Cited in the file of this patent

UNITED STATES PATENTS

| Re. 24,462 | Dreyfus | Apr. 22, 1958 |
| 1,922,029 | Chesnut | Aug. 15, 1933 |
| 1,983,242 | Rohn | Dec. 4, 1934 |

FOREIGN PATENTS

| 513,879 | Canada | June 21, 1955 |